United States Patent [19]
Handel

[11] Patent Number: 5,098,332
[45] Date of Patent: Mar. 24, 1992

[54] APPARATUS AND METHOD FOR FORMING CASINGLESS SAUSAGES AND THE LIKE

[75] Inventor: Gary A. Handel, Madison, Wis.

[73] Assignee: Oscar Mayer Foods Corporation, Madison, Wis.

[21] Appl. No.: 716,413

[22] Filed: Jun. 17, 1991

[51] Int. Cl.$^5$ ............................................. A22C 11/00
[52] U.S. Cl. ...................................... 452/46; 452/30; 425/513; 99/483
[58] Field of Search .................... 452/30, 35, 49, 46; 426/513, 646, 241, 271, 140, 302, 305, 315; 99/441, 483, 353

[56] References Cited

U.S. PATENT DOCUMENTS

| | | | |
|---|---|---|---|
| 3,889,013 | 6/1975 | Mouce | 426/513 |
| 4,280,803 | 7/1981 | Treharne | 426/513 |
| 4,379,356 | 4/1983 | Geissbühler | 426/513 |
| 4,404,229 | 9/1983 | Treharne | 426/513 |
| 4,437,206 | 3/1984 | Becker | 426/513 |
| 4,989,505 | 2/1991 | Mally | 99/483 |
| 5,056,425 | 10/1991 | Mally | 99/483 |

Primary Examiner—Willis Little
Attorney, Agent, or Firm—Lockwood, Alex, FitzGibbon & Cummings

[57] ABSTRACT

An apparatus and a method for forming casingless food products such as casingless sausages and the like is provided. The apparatus includes a denaturing solution into which a flowable batter material is extruded in a generally cylindrical configuration. The denaturing solution includes ingredients which act on the batter to form a skin. In a first embodiment, the extrusion apparatus extrudes batter directly into the denaturing solution and the extrusion orifice is adjustable reclosable to form domed ends of the batter material during the extrusion of the material into the solution. In a second embodiment, a shaping and cutting apparatus is provided to receive a continuous ribbon of batter from the extrusion apparatus. The cutting and shaping device cuts the ribbon into links and simultaneously forms domed ends thereon. The formed links are removed from the solution and, after an optional washing step, can be further processed into a cooked and packaged product.

26 Claims, 2 Drawing Sheets

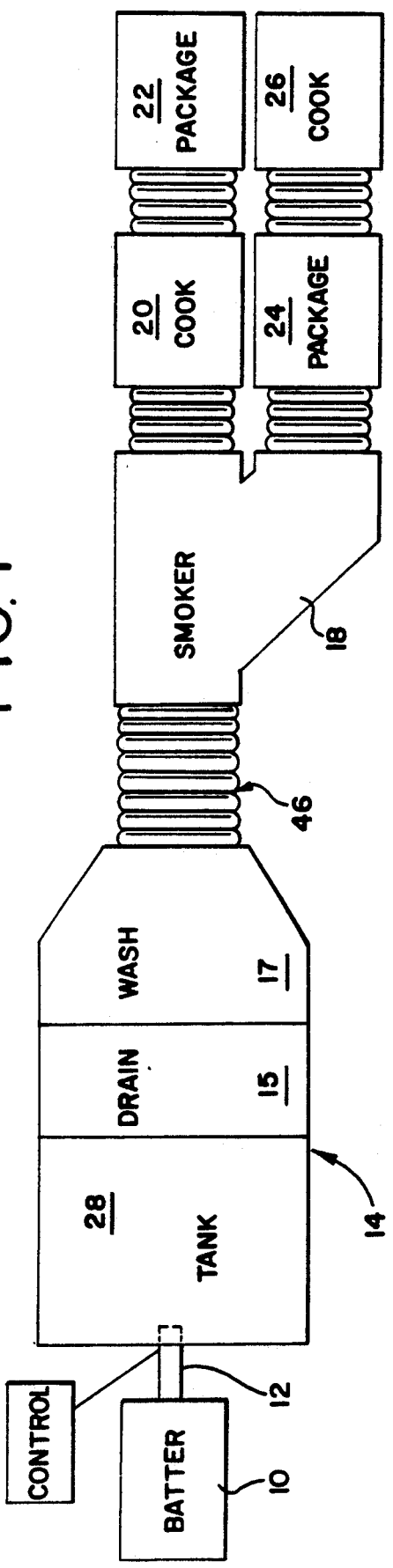
FIG. I
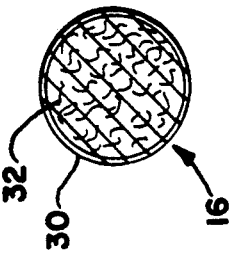
FIG. 3
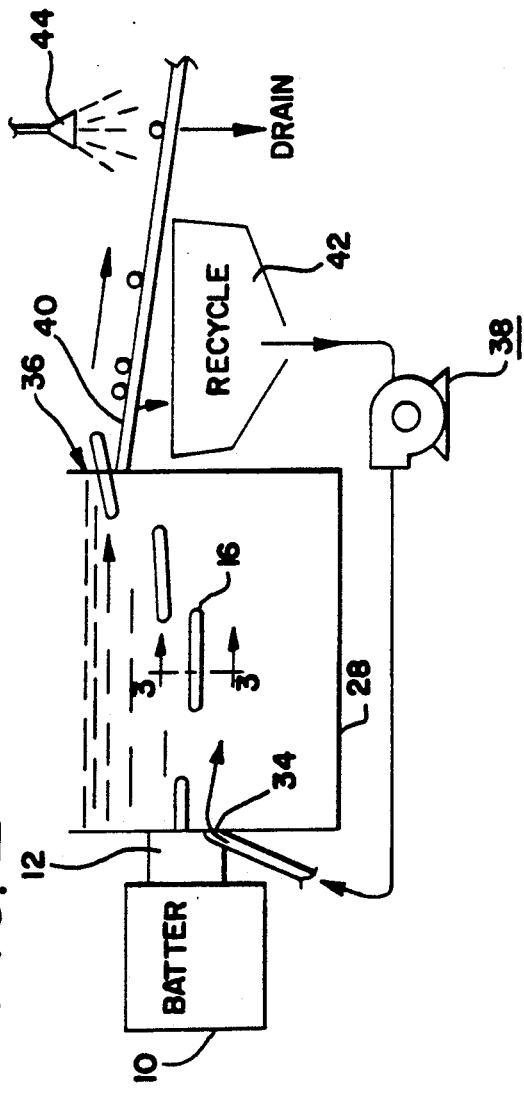
FIG. 2

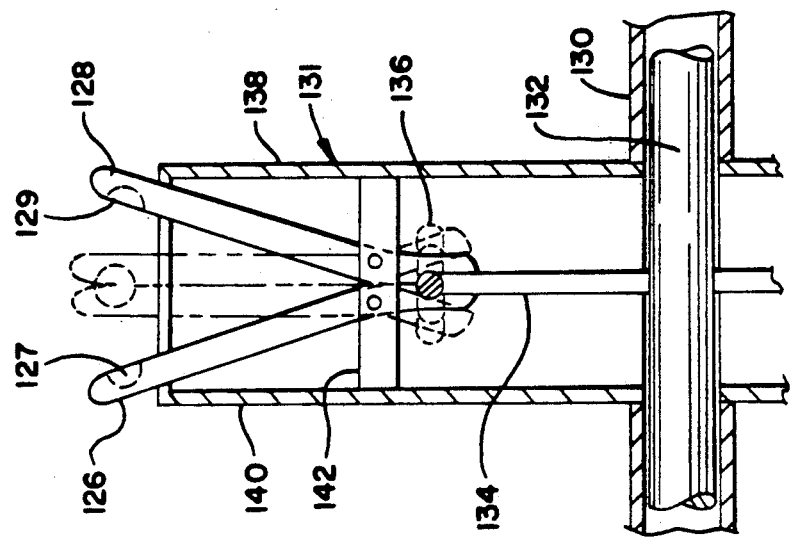
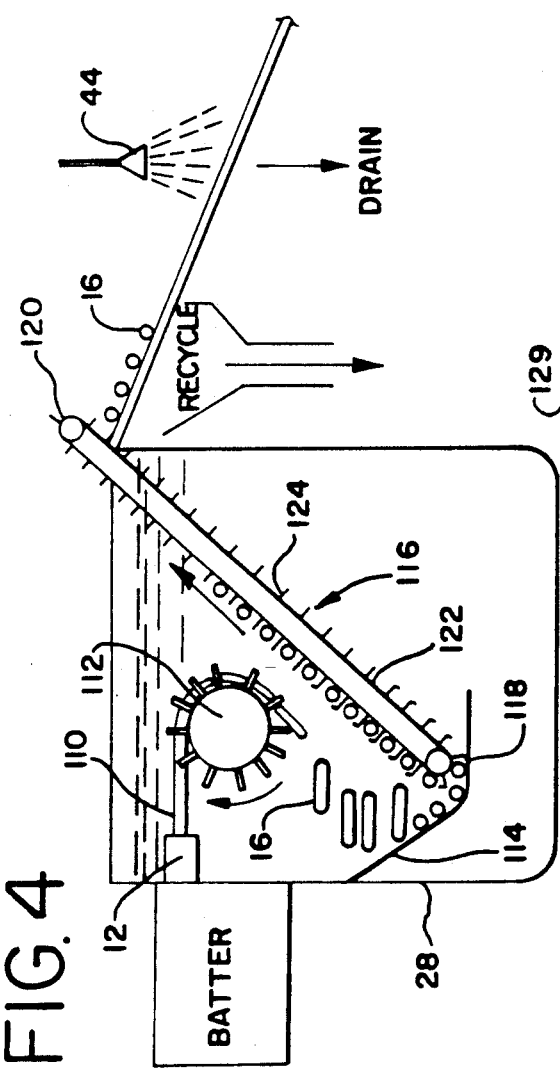
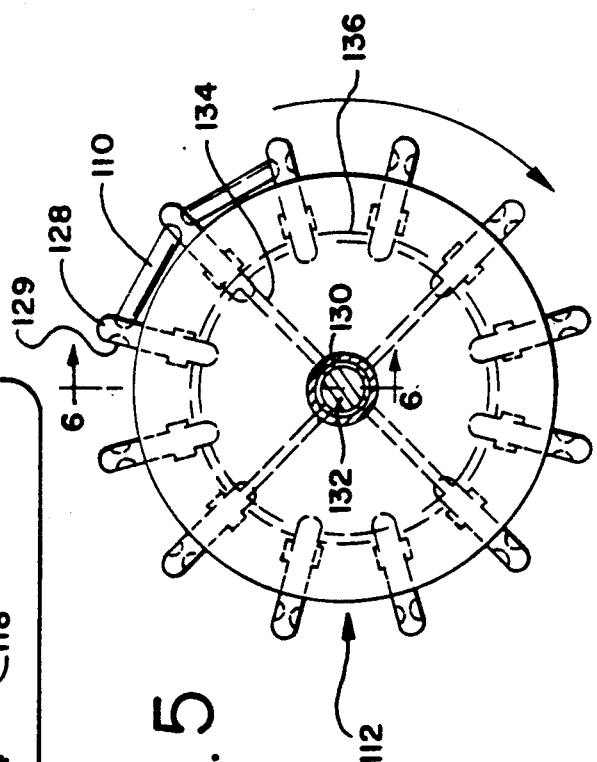

APPARATUS AND METHOD FOR FORMING CASINGLESS SAUSAGES AND THE LIKE

BACKGROUND AND BRIEF DESCRIPTION OF THE INVENTION

The subject invention generally relates to an apparatus for forming batter into a shaped product without using a casing or the like. More particularly, the invention relates to an apparatus for forming a casingless shaped product, such as a casingless sausage and the like, by forming a proteinaceous skin on batter-like materials in order to impart and maintain an initial shape to the batter material. The batter is initially formed and shaped by an extruder which deposits the batter into a denaturing solution. The solution includes ingredients to react with the surface of the batter to form a skin thereon. The apparatus has a shape-modifying assembly to impart a rounded configuration to the end portion of the initially shaped batter material.

Various devices are known for shaping batter materials such as a sausage batter, other food product batters and the like, and stuffing the batter into a casing which can complete the shaping of the batter as desired while maintaining the desired shape during further processing. Often, the further processing includes cooking or other procedure which modifies the consistency of the batter such that it will substantially maintain its desired shape. At least in the case of skinless wieners and other sausage products, each casing is subsequently removed during processing so that the product purchased by the consumer is a so-called casingless product, even though a casing had been used during processing. Such casing removal requires a specially designed apparatus, such as the one illustrated in Koken U.S. Pat. No. 4,414,707.

Various devices have been proposed for forming and processing sausages and the like without using casings. One suggested approach has been to form and cook a food batter within an elongated tube which has end-shaping plugs periodically spaced therewithin, as illustrated in U.S. Pat. No. 4,113,890. This requires a continuous inserting of the batter and plugs into the tube and removal of the plugs and cooked batter out of the tube. Another patent, Rogers U.S. Pat. No. 4,726,093, proposes making food products such as skinless sausages through the use of a series of plugs that engage a tube within which the batter is cooked.

Another suggested approach is to use a plurality of hollow molding tubes that are conveyed sequentially through an endless path. Geissbuhler U.S. Pat. No. 4,379,356 proposes the use of a plurality of molds having an open end such that sausage material will expand out of the tube and, this patent suggests, be formed into rounded sausage ends when each molding tube is conveyed through a heating zone, which is shown as a hot water bath.

Suggestions in the art as are exemplified by these patents call for shaping of a batter-like product within a tube or mold and thereafter removing the finally shaped product from the mold, and typically from a plurality of mold cavities or a mold cavity having a plurality of molding locations. Proposals of this general category tend to require complicated apparatus features, often including a complex molding structure having various moving parts and/or multiple components, which at times must be accurately indexed and/or aligned with respect to each other. Other approaches include a casingless arrangement as described in Mally U.S. Pat. No. 4,989,505.

By proceeding in accordance with the present invention, batter such as sausage batter and the like is transformed into a shaped product such as a sausage or the like without having to form that product within a casing and subsequently remove and discard the casing. An apparatus is provided wherein batter is stuffed into and extruded from a shaped cavity. The batter is extruded from the cavity into a denaturing solution in order to thereby form a proteinaceous skin which holds the batter together and imparts a preliminary shape which approximates the desired final shape of the product. The product is further shaped into the desired end product by forming the ends of the extruded batter into a generally rounded configuration. The ends of the batter may be shaped by controlling the diameter of the extrusion orifice during extrusion of the product into the denaturing solution. Alternatively, the ends may be shaped by depositing a ribbon of extruded batter onto a shaping and cutting device which both cuts the extruded batter into link-sized lengths while simultaneously shaping the ends of the batter into the desired configuration. The link-shaped batter material is removed from the denaturing solution in one of at least two ways. In one preferred embodiment, the links are directed through the denaturing tank by directing and controlling a flow of denaturing solution through the tank to carry the links out of the tank along with denaturing solution which may then be recycled. Alternatively, a conveyor-like apparatus is provided to pick up and convey the individual links from the bottom of the tank, through the denaturing solution and out of the tank for further processing by smoking, cooking, and packaging of the product.

The apparatus and method of the invention provide substantial savings in cost and labor, eliminating the need for casings and the equipment typically associated with their use.

It is a general object of the present invention to provide an improved apparatus for transforming batter into shaped products without utilizing casings or the like.

Another object of the present invention is to provide an improved apparatus that includes forming at least a portion of a batter originating product with an assembly which does not include a product-conforming mold.

Another object of the present invention is to provide an improved apparatus for making casingless food products that can be cooked and then packaged.

Another object of the present invention is to provide an improved apparatus for forming casingless products that can be packaged and then aseptically cooked within the package.

Another object of the present invention is to provide an improved sausage making apparatus which is of an especially simplified construction.

Another object of the present invention is to provide a sausage making apparatus which reduces the cost of utilities when compared with conventional casing-utilizing systems.

Another object of the present invention is to provide an apparatus for making sausages and the like that does not require any casing removal devices.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is a top plan view of a sausage processing line incorporating features according to the present invention;

FIG. 2 is an enlarged side elevational view, in schematic, of one embodiment of the present invention;

FIG. 3 is a sectional view taken along the 3—3 line of FIG. 2;

FIG. 4 is an enlarged side elevational view, in schematic, of another embodiment of the present invention;

FIG. 5 is an enlarged side elevational view of a portion of the embodiment depicted in FIG. 3; and FIG. 6 is a sectional view taken along the 6—6 line of FIG. 4.

DETAILED DESCRIPTION OF THE PREFERRED EMBODIMENTS

FIG. 1 illustrates a layout for a sausage processing line incorporating the present invention. A batter preparation apparatus 10 includes a mixing and feeding assembly of generally known construction by which components such as sausage ingredients are combined and blended to desired product identity, consistency, taste and the like into a pumpable batter. Batter preparation apparatus 10 feeds into a stuffing and shaping apparatus 12 which ejects shaped products or blanks into a denaturing station 14 which includes a tank 28 containing a denaturing solution to assist in the formation of the blanks into uncooked products 16, as described below.

A drain station 15 is provided to drain excess denaturing solution from the products 16 for recycling back into the tank 28. An optional wash station 17 may be provided to wash products 16 prior to further processing. Uncooked products 16 can then be conveyed down the process line and processed as needed or desired. For example, sausage products 16 can be flavored in a smoker apparatus 18 which can be of generally known construction FIG. 1 illustrates cooking and packaging arrangements which can be utilized or eliminated as desired. The cooking apparatus 20 can precede a packaging apparatus 22, typically of known construction. An alternative packaging apparatus 24 and cooking apparatus 26 can be provided, as discussed in greater detail below.

With more particular reference to the denaturing apparatus 14, the apparatus includes a denaturing tank 28 such as that illustrated in a first preferred embodiment, as shown in FIG. 2. Batter for the batter preparation apparatus 10 is pumped to a molding compartment in the stuffing and shaping apparatus 12 through suitable equipment. A suitable ejection mechanism will eject the partially shaped products or blanks out of an open end of the molding component. A suitable ejection mechanism is described in U.S. Pat. No. 4,989,505, the subject matter of which is incorporated by reference hereinto. In the embodiment illustrated in FIG. 2, a single shaped product is formed during each cycle of the apparatus, although it will be appreciated that multiple product formation or generally continuous product formation can also be carried out by appropriate and known modification of the equipment.

In the embodiment depicted in FIG. 2 herein, the open end of the molding component is preferably of a design which allows for the control of the diameter of the opening during ejection of the product 16 into the denaturing tank 28. Those skilled in the art will appreciate that control of the aforementioned opening can be accomplished in several ways such as by mechanical control or by use of a deformable tubing such as a rubber-like tubing for example. In such a device, the outer surface of the tubing is subjected to varying pressures around the extrusion orifice to adjustably and reclosably control the diameter of the tube to provide a food product 16 of a finite length having the rounded end configuration typically associated with wieners such as sausages and the like. Alternatively, a mechanical aperture can be provided to open at a predetermined rate while the batter is being extruded from the apparatus 12 to form a first rounded end on the food product 16 and, once the desired length of the food product 16 is obtained, the aperture can be closed at a controlled rate to form the second rounded end of the food product 16. The length of the product can be varied as required.

In the preferred embodiment of FIG. 2, the formed food product 16 is ejected directly into a tank 28 which is filled with a denaturing solution. The solution includes ingredients which react with the outermost portion of the surface of the food product 16 to form a thin proteinaceous skin or outer layer 30 (FIG. 3) of the food product. The skin serves to hold the raw batter 32 in its elongated sausage-like shape prior to cooking and packaging and in the absence of the use of an outer casing. A typical skin in this regard is on the order of between about 0.020 and about 0.050 inch thick. Prior to cooking, the food product 16 will still contain raw batter 32 having the same consistency of the viscous batter prior to extrusion into the denaturing solution. The batter-like center 32 of the food product 16, at this point, is maintained in a wiener-like configuration solely by the outer skin 30.

Regarding the denaturing solution, the solution should be at least moderately acidic to form the skin 30 on a typical food product batter such as that described herein. Typical components will include acetic acid and water as well as flavor enhancing ingredients such as "liquid smoke". Using such components, a preferred denaturing solution will be sufficiently acidic to form the outer skin 30 within about 2 to about 5 minutes so that the links can be removed from the tank 28 thereafter.

The denaturing solution should be formulated to include acetic acid at a concentration of between about 2% and about 90% by volume, and water. Preferably, the denaturing solution will include at least about 10% by volume of a commercially available liquid smoke product, at least about 20% by volume acetic acid and about 70% by volume water. As those skilled in the art will appreciate, the liquid smoke will be acidic since acetic acid is a typical component in such products. Accordingly, the liquid smoke product, when added to the denaturing solution, enhances the acidity of the denaturing solution while also providing a flavor enhancing function to the manufacture of casingless sausages in accordance with the present invention. In fact, a denaturing solution of 100% liquid smoke will typically be acidic enough to form the skin 30 without additional acetic acid or water. The acidic denaturing solution aids in preventing contamination of the product and, upon exiting the tank 28, the links will be sufficiently congealed to tolerate manipulation by link-handling equipment.

In the first preferred embodiment, the apparatus of the present invention is provided with a tank 28 which includes inflow and outflow ports, generally indicated at 34 and 36, respectively. In this arrangement of parts, a positive flow of recycling solution is established within the tank 28 to push or direct the food product 16 through the denaturing solution from the time it leaves the forming apparatus 12 to exit the tank at the outflow port 36. Typically the respective specific gravities of the denaturing solution and food product 16 are such that the solution exerts a buoyant force on the product 16 adequate to provide a product flow path as generally depicted in FIG. 2 or FIG. 4. The optimum flow rate of solution can be varied and will depend on various factors which will be appreciated by those skilled in the art such as the size of the tank and the volume of denaturing solution contained therein as well as the desired amount of time in which the formed product 16 is to reside within the denaturing solution to adequately form the aforementioned skin 30. In this manner, the food product 16 will be directed by the flow of denaturing solution to have a residence time within the tank 28 which is preferably between about 2 and about 5 minutes and, most preferably about 3 minutes. In this manner, formation of the outer skin 30 is accomplished so that when the food product 16 exits through the outflow 36 of the tank 28, the skin 30 is sufficiently formed so that the food product 16 will retain its sausage-like shape throughout the remainder of the process, illustrated in FIG. 1.

Upon exiting the tank 28, food product 16 is deposited on a screen 40. Denaturing solution which exits the tank 28 along with the food product 16 drains through the screen 40 and into a recycling apparatus 42 to recycle the denaturing solution in a known manner. A pump 38 is preferably provided with the recycling apparatus 42 to maintain a constant controlled flow of denaturing solution through the tank 28. Additional filters and other cleaning, filtering or purifying components may be included within the recycling apparatus 42, as known by those skilled in the art.

The formed food products are then directed down the screen wherein they may be subjected to an optional washing step to rinse excess denaturing solution from the outer skin 30 such as by the depicted nozzle 44. The use of nozzle 44 in washing the food product 16 is optional and food product may be further processed in the absence of such a washing step without detrimentally effecting the taste, quality, and the like of the cooked and packaged food product. The formed casingless food product 16 is conveyed from the drain and washing stations down a conveyor for further processing, as discussed below. In the embodiment depicted in FIG. 2, a food product 16 is transferred from the tank 28 through the recycling station and through the washing step and to a downwardly extending incline of screen 40 which slopes down from the outflow 36 to the conveyor 46. Other means for transferring the formed food product 16 to the conveyor 46 are contemplated as within the skill of those in the art. For example, porous trays or the like can be provided on the conveyor and the conveyor can be positioned at the outflow port 36 so that the food product 16 is deposited directly onto a tray which is conveyed on the conveyor 46 to the smoker 18 or to the cook or package stations 20 or 24, respectively. In such an arrangement, the pores of the tray would provide a means for draining the denaturing solution back down into the recycling apparatus 42 for recycling back into the tank 28. Likewise, the washing step provided by nozzle 44 could still be accomplished with excess water and denaturing solution being drained from the trays through the aforementioned pores.

A second preferred embodiment is depicted in FIGS. 4 through 6 herein. Some of the features which have already been described above are also included as features of the second preferred embodiment and a discussion of those features will not be repeated. Referring now to FIG. 4, the means for forming the batter-like food product into links and the manner in which the thus formed links are removed from the denaturing solution is depicted. In this embodiment, a ribbon of batter 110 is extruded into the denaturing solution by the forming apparatus 12 in a conventional manner. The ribbon 110, as extruded, is a continuous length of batter which requires further handling to form the rounded or bullet-shaped ends. Shaping of the ribbon 110 is accomplished in the depicted embodiment by the forming device 112 which both cuts the ribbon 110 and forms the bullet-shaped ends thereon.

The ribbon forming device 112 is provided in a substantially circular configuration having a plurality of identical scissor-like arms 126 and 128 equally spaced along the circumference of a housing 131 to form a gap between adjacent pairs which is equal to the desired length of the links 16. Each pair of arms are pivotally mounted to a cross member 142 which spans the gap between the side members 138 and 140. The device 112 is rotated along hollow drive shaft 130 to move each pair 126, 128 around a 360° arc. Camming means are provided whereby each pair 126, 128 is positioned in an opened "v" configuration when the pair is at its uppermost position along the aforementioned arc of rotation (FIG. 6) and then in a closed configuration when the pair is at its lowermost position (shown in phantom in FIG. 6) along the arc.

In the embodiment shown and described herein, fixed shaft 132 resides within hollow shaft 130. A plurality of radially extending spoke members 134 are affixed to the shaft 132 and extend to a circular camming rim 136. The rim 136 is provided with a continuously variable width on its circular length which is received within slots or grooves (not shown) in the arms 126 and 128. Rotation of the shaft 130 and housing 131 also rotates the pairs of arms about the arc of the fixed rim 136. The variable width of the rim forcibly positions the arms between the aforementioned opened and closed configurations in a known manner. In this arrangement of parts, the extruded ribbon 110 is continuously received by the forming device 112 between opened pairs of arms 126, 128, at the uppermost position of the arc of rotation. As the arms continue to rotate along the arc to the lowermost portion thereof, the camming mechanism gradually closes the arms, pinching the ribbon 110 into the individual links 16 of the desired length. End-shaping means are provided on the arms 126, 128 in the form of semi-spherical cups or depressions 127 and 129, or their equivalent. In this manner, the ends of the links 16 are formed in their desired rounded shape by the cups 127 and 129 as the arms 126 and 128 simultaneously pinch the ribbon 110 into individual lengths. Separate pairs of cups are provided on both sides of each pair of arms 126, 128 to shape each successive length of the ribbon 110 into the individual links 16.

As the successive pairs of arms reach their lowermost position along the arc of rotation, individual links 16 are formed and cut from the ribbon 110 by the foregoing action of the arms 126, 128 and semi-spherical cups 127, 129. When so formed, the link 16 drops from the forming device 112 and falls through the denaturing solution to the inclined surface 114 which orients the link 16 and directs it toward the conveyor 116, as depicted in FIG. 4. The conveyor 116 is an elastomeric belt type conveyor wherein a belt member 122 is reaved around rollers 118 and 120 and driven in a known manner. The conveyor 116 includes a belt member 122 and a plurality of evenly spaced feet 124 which are attached to and extend outwardly from the belt member 122 in a substantially perpendicular relationship. In this arrangement of parts, the links 16 are picked up by the feet 124 and are conveyed up through the denaturing solution to exit at the opposite end of the tank 28 from which the batter forming apparatus 10 is positioned. As shown in FIG. 4, the conveyor 116 is preferably positioned within the tank 28 on an incline so that the links 16 can be picked up on feet 124 and held thereon.

Once the links 16 have been removed from the denaturing solution, the remainder of the sausage manufacturing process is identical to that described above with respect to FIGS. 1 through 3. Again, excess denaturing solution can be drained off of the links 16 and recycled back into the tank 28. It should be noted, however, that the flow of recycled denaturing solution will be substantially reduced in the embodiment of FIG. 4. Preferably, the flow of recycling solution will be such that the replacement of solution within the tank 28 creates no additional fluid forces which would prevent the links 16 from freely falling to the surface 114 on the bottom of the tank 28 for pickup by the feet 124 of conveyor 116.

When provided, the smoker apparatus 18 can include a smoke chamber of generally known construction. Particularly effective smoking can be practiced inasmuch as the uncooked products 16 do not have a casing, which would otherwise have to be penetrated by the smoke media when other devices are used. Uniformity of smoke application can be enhanced by continuing the conveyor into and through the smoker apparatus 18. It will be appreciated that an additional smoking step will generally not be needed if liquid smoke is used as a component in the denaturing solution. Concerning the combination illustrated in FIG. 1 of the cooking apparatus 20, the conveyor assembly 46 will continue into the cooking apparatus 20 in order to undergo generally conventional cooking procedures. Exemplanary cooking procedures would include oven heating, convection heating and/or microwave heating. The thus cooked products are then transferred to a packaging apparatus of a generally known type. By this procedure, vacuum packaged groups of casingless products, such as wieners, are provided, and these packaged products will have a shelf-life of an acceptable length.

It will be appreciated that various means can be provided to deliver batter into the denaturing solution and to subsequently retrieve the links 16 therefrom for further processing as mentioned. Any means for supplying and delivering uncooked batter into the above-discussed denaturing solution, forming the batter into individual links and then retrieving the links from the solution are contemplated. In general, any means for forming a casingless food product, such as a sausage, by use of a denaturing solution like that described herein is within the scope of the present invention.

Because the uncooked products 16 can be handled to a certain extent, prior to cooking them, and because there is no casing that needs to be removed after cooking, it is possible to package the uncooked products 16 in the alternative packaging apparatus 24. Generally speaking, these uncooked products 16 are packaged in a substantially raw state. Subsequent cooking in the alternative cooking apparatus 26 is carried out after packaging, thereby enabling the formation of an aseptic package of the desired products, such as wieners, other sausages, or the like. The alternative cooking apparatus 26 would typically include a hot-water cooking bath, a hot platter cooking apparatus, or the like. By utilizing this apparatus to form an aseptic package, subsequent treatments to enhance shelf-life, such as temperature reduction devices, can be eliminated.

While particular embodiments of the invention have been described, it will be appreciated that various modifications and changes may be made without departing from the true spirit and scope of the invention. Accordingly, it is intended by the appended claims to cover such modifications and equivalents which embody the inventive features as defined in the claims.

I claim:

1. An apparatus for forming a casingless sausage and the like, comprising:
   extrusion means for extruding a flowable batter material into a generally cylindrically configured extrusion;
   tank means containing a denaturing solution therein, said tank means being associated with said extrusion means for receiving said generally cylindrically configured extrusion and for submerging same in the denaturing solution, said denaturing solution including ingredients which act on said batter material of the extrusion to form a skin thereon;
   cutting means for cutting said generally cylindrically configured extrusion into substantially uniform lengths, each such length having a first end and a second end thereon; and
   shaping means associated with said cutting means for shaping said first end and said second end of each said length.

2. An apparatus as defined in claim 1 wherein said tank means is associated with said extrusion means such that said flowable batter material is extruded into said tank means beneath the surface of said denaturing solution.

3. An apparatus as defined in claim 1 wherein said tank means denaturing solution includes water and acetic acid in an amount between about 2% and about 90% by volume, based on the total volume of the denaturing solution.

4. An apparatus as defined in claim 1 wherein said shaping means and said cutting means are provided as a reclosable orifice forming a part of said extrusion means, said orifice being positionable between a closed position and an opened position to form said first end and said second end, said first end being formed by opening said orifice while said batter is extruded therethrough to provide a rounded taper to said first end of said flowable batter material as it enters said tank and said second end being formed by closing said orifice to provide a rounded taper to said second end after a measured length of said flowable batter material has passed through said orifice and into said tank.

5. An apparatus as defined in claim 1 wherein said shaping means and said cutting means are provided in the form of a shaping and cutting apparatus positioned within said tank, said shaping and cutting apparatus having a plurality of identical scissor-like pairs of arms, said pairs equally spaced and rotatable along a substantially circular arc, said apparatus including camming means for positioning each said pair of arms between opened and closed configurations, said camming means positioning each said pair of arms in said opened configuration when at its uppermost position along said arc and said camming means positioning each said pair of arms in said closed configuration when at its lowermost position along said arc.

6. An apparatus as defined in claim 5 wherein each of said pairs of arms are equipped with cup members affixed thereto, said cup members forming said ends of said flowable batter material into a generally rounded configuration when said pairs of arms are in said closed configuration.

7. An apparatus as defined in claim 1 further comprising removal means for removing said substantially uniform lengths from said denaturing solution and s id tank means.

8. An apparatus as defined in claim 7 wherein said removal means includes input and outflow valves to direct a flow of said denaturing solution through said tank means, said flow of said denaturing solution directing said lengths of batter through said tank means and said denaturing solution to deposit said lengths of batter outside of said tank means.

9. An apparatus as defined in claim 7 wherein said removal means includes a conveyor having a conveyor belt with a plurality of feet thereon, said feet extending perpendicularly outwardly from the surface of said conveyor belt to provide a shelf which is dimensioned to hold said lengths and to convey said lengths upwardly through said denaturing solution and out of said tank means.

10. An apparatus for forming a casingless sausage and the like comprising:
- extrusion means for extruding a flowable batter material into a generally cylindrically configured extrusion;
- an adjustably reclosable orifice associated with said extrusion means, said orifice being variably adjustable between a fully opened position and a closed position for forming a first end and a second end of a length of said generally cylindrically configured extrusion, each of said ends being formed by said orifice to have a generally domed configuration; and
- a tank means containing a denaturing solution associated with said orifice, said denaturing solution including ingredients which act on said batter material to form a skin thereon, and said tank means receives the generally cylindrically configured extrusion and submerges the extrusion in the denaturing solution.

11. An apparatus as defined in claim 10 wherein said tank is associated with said extrusion means such that said flowable batter material is extruded into said tank beneath the surface of said denaturing solution.

12. An apparatus as defined in claim 10 wherein said denaturing solution includes water and acetic acid in an amount between about 2% and about 90% by volume based on the total volume of the denaturing solution.

13. An apparatus as defined in claim 10 further comprising removal means for removing said batter material from said denaturing solution and said tank, said removal means including input and outflow valves to direct a flow of said denaturing solution through said tank, said flow of said denaturing solution directing said batter material through said tank and said denaturing solution to deposit said batter material outside of said tank.

14. An apparatus for forming a casingless sausage and the like, comprising:
- extrusion means for extruding a flowable batter material in a generally cylindrical configuration;
- a cutting and shaping apparatus associated with said extrusion means for cutting said flowable batter material into individual lengths having a first end and a second end, said cutting and shaping apparatus further including means for shaping both said first end and said second end to have a generally domed configuration; and
- a tank means containing a denaturing solution associated with said cutting and shaping apparatus and with said extrusion means, said denaturing solution including ingredients which act on said batter material to form a skin thereon and said tank means is for receiving the generally cylindrical extruded batter and contacting same with the denaturing solution within said tank means.

15. An apparatus as defined in claim 14 wherein said tank is associated with said extrusion means such that said flowable batter material is extruded into said tank beneath the surface of said denaturing solution.

16. An apparatus as defined in claim 14 wherein said denaturing solution includes water and acetic acid in an amount between about 2% and about 90% by volume based on the total volume of the denaturing solution.

17. An apparatus as defined in claim 14 wherein said shaping and cutting apparatus includes a plurality of scissor-like pairs of arms, said pairs being equally spaced and rotatable along a substantially circular arc, said apparatus including camming means for positioning each of said pairs of arms between opened and closed configurations, said camming means positioning each said pair of arms in said opened configuration when each said pair of arms is at its uppermost position along said arc and said camming means positioning each said pair of arms in said closed configuration at its lowermost position along said arc.

18. An apparatus as defined in claim 17 wherein each of said pairs of arms are equipped with cup members affixed thereto, said cup members forming said ends of said flowable batter material into said generally domed configuration when said pairs of arms are in said closed configuration.

19. An apparatus as defined in claim 14 further comprising removal means, said removal means including a conveyor having a conveyor belt with a plurality of feet thereon, said feet extending perpendicularly outwardly from the surface of said conveyor belt to provide a shelf thereon which is dimensioned to hold said lengths of batter and to convey said lengths through said denaturing solution and out of said tank.

20. A process for forming a casingless sausage and the like, comprising:
- providing a flowable batter material in a generally cylindrical configuration;
- forming said batter material to have defined length having a first end and a second end;
- shaping both said first end and said second end of said generally cylindrical batter material of a defined length to have a generally domed configuration;
- forming a skin on said generally cylindrical batter material defined length, said skin-being formed by placing said generally cylindrical defined length into a denaturing solution including ingredients which act on said batter material to form said skin; and removing said generally cylindrical batter material defined length from said denaturing solution.

21. A process as defined in claim 20 wherein said forming of said defined length of batter material and said shaping of said first end and said second end thereon are accomplished by extruding the batter material through an extrusion means having an adjustably reclosable orifice, adjusting the orifice between a fully opened position and a fully closed position to form the first end of the batter material to have a generally domed configuration by the gradual opening of the orifice while the batter material is extruded therethrough and to form the second end being formed by the gradual closing of the orifice while the batter material is extruded therethrough.

22. The process as defined in claim 20 wherein said providing of said batter material is accomplished by extruding a continuous length of the generally cylindrical batter material.

23. The process of claim 22 wherein said forming and shaping of said batter material is accomplished by cutting the continuous length of batter into individual lengths while simultaneously shaping the ends of the individual lengths to have generally domed configuration.

24. The process as defined in claim 23 wherein said cutting includes positioning the continuous length of batter between scissor-like pairs of arms rotatable about a fixed axis, moving the scissor-like arms from an opened configuration to a closed configuration while rotating about said axis and thereby cutting the said continuous length of batter into the individual lengths, and substantially simultaneously forming ends of said batter material into said generally domed configuration by closing cup members of the arms onto the batter.

25. The process as defined in claim 20 wherein said forming of a skin on said batter material is accomplished by placing said batter material into said denaturing solution including water and acetic acetic in an amount between about 2% and about 90% by volume acetic acid based on the total volume of the denaturing solution.

26. The process as defined in claim 20, further comprising:

washing said batter material to remove excess denaturing solution therefrom; packaging said batter material; and cooking said batter material.

* * * * *

UNITED STATES PATENT AND TRADEMARK OFFICE
CERTIFICATE OF CORRECTION

PATENT NO. : 5,098,332
DATED : March 24, 1992
INVENTOR(S) : Gary A. Handel It is certified that error appears in the above-identified patent and that said Letters Patent is hereby corrected as shown below:

Column 3, line 41, after construction insert --.--.
Column 9, line 18, "s id" should read --said--.
Column 10, line 67, "skin-being" should read --skin being--.
Column 12, line 16, "acetic acetic" should read --acetic acid--.

Signed and Sealed this

Twenty-ninth Day of June, 1993

Attest:

MICHAEL K. KIRK

*Attesting Officer*      *Acting Commissioner of Patents and Trademarks*